United States Patent
Lin et al.

(10) Patent No.: US 7,974,642 B2
(45) Date of Patent: Jul. 5, 2011

(54) SYSTEM AND METHOD FOR ESTIMATING CELL CENTER POSITION FOR CELL ID BASED POSITIONING

(75) Inventors: Xiangdong Lin, Irvine, CA (US); Mangesh Chambarkar, Sunnyvale, CA (US); Marlene Wan, Sunnyvale, CA (US); Lionel Garin, Palo Alto, CA (US)

(73) Assignee: SiRF Technology, Inc., San Jose, CA (US)

( * ) Notice: Subject to any disclaimer, the term of this patent is extended or adjusted under 35 U.S.C. 154(b) by 870 days.

(21) Appl. No.: 11/676,927

(22) Filed: Feb. 20, 2007

(65) Prior Publication Data

US 2008/0200187 A1    Aug. 21, 2008

(51) Int. Cl.
H04Q 5/00    (2006.01)

(52) U.S. Cl. .............. 455/456.6; 455/422.1; 455/440; 455/456.1; 455/456.5

(58) Field of Classification Search .......... 455/456.5, 455/456.6, 422.1, 440, 456.1
See application file for complete search history.

(56) References Cited

U.S. PATENT DOCUMENTS

| | | | | |
|---|---|---|---|---|
| 6,975,873 B1 * | 12/2005 | Banks et al. | | 455/456.5 |
| 2002/0080063 A1 | 6/2002 | Bloebaum et al. | | |
| 2003/0125046 A1 | 7/2003 | Riley et al. | | |
| 2003/0236095 A1 * | 12/2003 | Ross | | 455/456.1 |
| 2004/0127228 A1 * | 7/2004 | You et al. | | 455/456.1 |
| 2004/0152470 A1 | 8/2004 | Spain | | |
| 2006/0009235 A1 | 1/2006 | Sheynblat et al. | | |
| 2007/0093257 A1 | 4/2007 | McDougall et al. | | |

* cited by examiner

*Primary Examiner* — Charles N Appiah
*Assistant Examiner* — William F Rideout
(74) *Attorney, Agent, or Firm* — RatnerPrestia

(57) ABSTRACT

Systems and methods for estimating a cell center location in a wireless communication system having all interface to a satellite positioning system ("SPS") such as for example, a Geosynchronous Positioning System ("GPS"). The wireless communication system provides service to mobile stations within a cell, each mobile station includes a SPS receiver. Examples of the systems and methods for estimating a cell center location analyze the mobile station locations in a cell as a uniform distribution of mobile station locations and calculate a statistical measure characterizing the mobile station locations as a function of the mobile station locations. In one example, the statistical measure is a maximum likelihood mobile station location. In another example, the statistical measure is the mean mobile station location in the cell. The estimated cell center location may be used to approximate the location of the mobile station during a warm or cold restart of the SPS receiver part of the mobile station.

27 Claims, 13 Drawing Sheets

SYSTEM AND METHOD FOR ESTIMATING CELL CENTER POSITION FOR CELL ID BASED POSITIONING

CROSS REFERENCE TO RELATED APPLICATIONS

This application also claims priority to U.S. patent application Ser. No. 11/645,114, filed Dec. 22, 2006, titled "SYSTEM AND METHOD FOR ESTIMATING CELL CENTER POSITION FOR CELL ID BASED POSITIONING," which is a continuation-in-part of U.S. patent application Ser. No. 10/489,225, filed Sep. 10, 2002, titled "System of Utilizing Cell Information to Locate a Wireless Device," which claims priority under Section 119(e) to U.S. Provisional Application Ser. No. 60/318,806, filed Sep. 10, 2001, each of which are incorporated into this application by reference.

BACKGROUND OF THE INVENTION

1. Field of the Invention

This invention relates generally to positioning systems, and more particularly, to using wireless communications systems to provide aiding information to a positioning system.

2. Related Art

In densely built urban areas, the use of a positioning system such as a Satellite Positioning System (SPS)—for example, a Global Position System (GPS), also known as NAVSTAR— is often not available or reliable due to various reasons such as, for example, multipath, shadowing, and path loss. In many situations, however, a GPS receiver may be associated with a cell of a cellular communication network and the base station serving that particular cell. Accordingly, one method for mobile phone positioning is to use the cell area coverage information (Cell ID) of the caller as a coarse location estimate to obtain the approximate location of the caller. Eli urban areas, cell position accuracy may be as close as 100 meters, and therefore the center of a cell can be employed as the alternative position when GPS positioning has a larger error or is not available. The cell ID information is usually or always available and reliable, and is independent of GPS measurements, and can also be easily obtained by paging or updating. Thus, the center of a cell may be employed as an approximate location of a mobile communication device located within that cell.

While the location of the center of a cell may be available to mobile telephone companies, it is usually not available to GPS location providers. Therefore, there is a need for providing systems or methods for making estimated cell center locations available to GPS location providers.

SUMMARY

According to one aspect of the subject matter disclosed, systems and methods for estimating a cell center location provide the estimated cell center location as an approximate location for a SPS receiver in a mobile station. Example systems for estimating a cell center location in a SPS system may include a SPS server connected to the SPS system to retrieve a plurality of mobile station locations from mobile stations in a cell in a wireless communication system, each mobile station comprising an SPS receiver. A SPS database stores the plurality of mobile station locations and a cell identifier to identify the cell in which the mobile station is obtaining wireless communications service. A cell center location estimator calculates an estimated cell center location by obtaining N mobile station locations assumed to be uniformly distributed in a cell i and calculating a statistical measure of the mobile station locations, where the statistical measure is either a maximum likelihood mobile station location or a mean mobile station location.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description, reference is made to the accompanying drawings that form a part hereof, and in which is shown by way of illustration one or more specific exemplary embodiments in which the invention may be practiced. It is to be understood that other embodiments may be utilized and structural changes may be made without departing from the scope of this invention.

Figure 1:
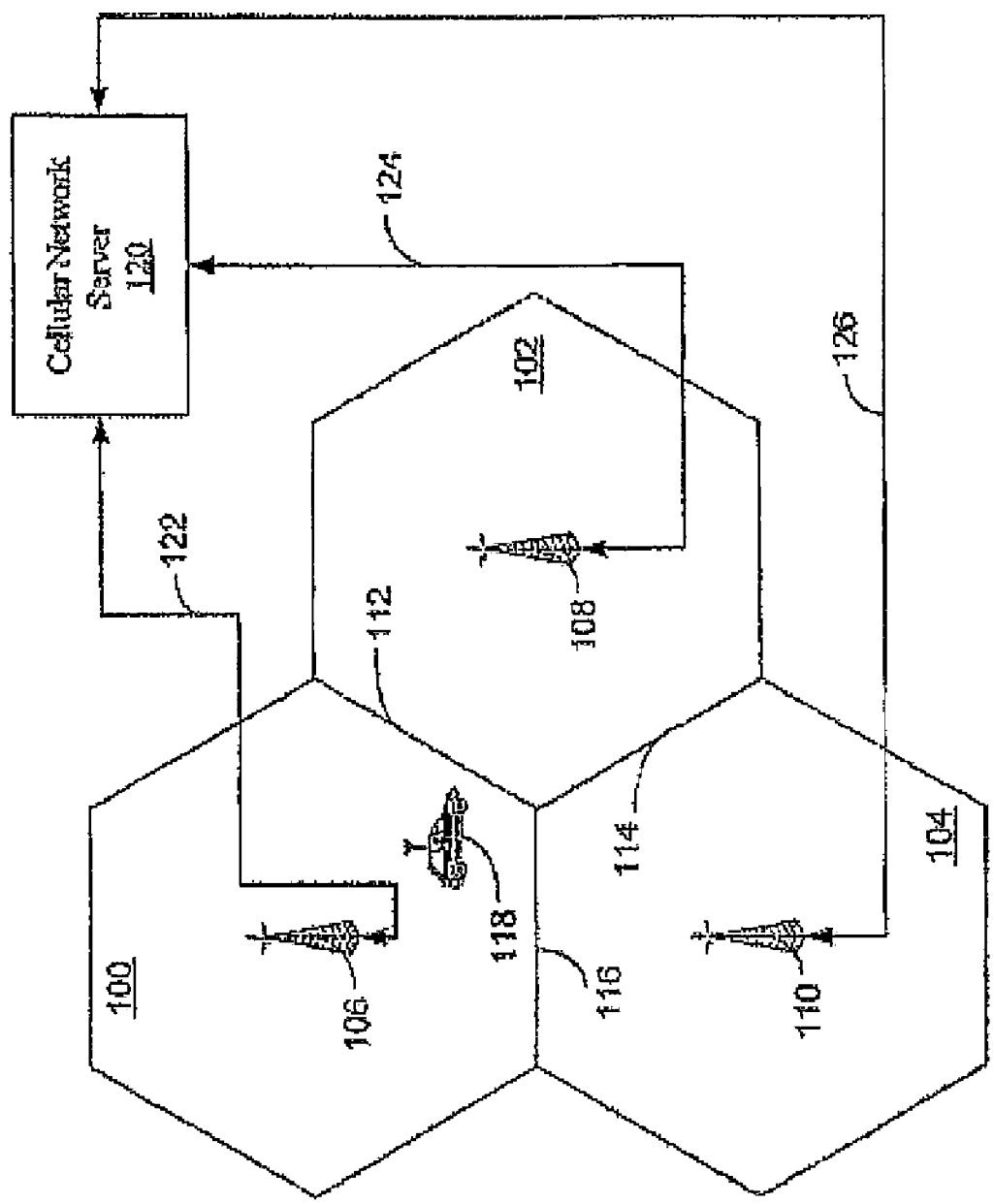
FIG. 1 is a block diagram of an example of a system for providing location-based services.

FIG. 1 is a graphical representation of three cell sites within a cluster of cells of a cellular telephone network (known as the "cellular network"). FIG. 1 illustrates a plurality of cells 100, 102 and 104 in the cellular telephone network. Consistent with convention, each cell 100, 102 and 104 is shown symbolically as having a hexagonal cell boundary. Within each cell 100, 102 and 104 are base stations 106, 108 and 110 that are located near the center and/or centroid of the corresponding cell 100, 102 and 104. Specifically, the base station 106 is located within cell 100, the base station 108 is located within cell 102, and the base station 110 is located within cell 104.

The boundaries 112, 114 and 116 separating the cells 100, 102 and 104 generally represent an area where handoff occurs between the cells 100, 102 and 104. As al example, when a wireless device 118 (also known as a "mobile unit" or "mobile station") moves away from the base station 106 in the cell 100 towards all adjacent base station 108 in the adjacent cell 102, the signal-to-interference plus noise ratio ("S/I+N") from the base station 106 will drop below a predetermined threshold level while, at the same time, the S/I+N from the second base station 108 increases above this predetermined threshold as the wireless device 118 moves over the boundary 112 into the cell 102. Cellular systems are designed to provide coverage from each base station within areas that roughly overlap at the boundaries 112, 114 and 116. In addition, wireless devices are designed to receive signals from various base stations and are capable of initiating a handoff if the signal level of one station is stronger than the one currently being used for communication.

Each cell 100, 102 and 104 and its corresponding base station 106, 108 and 110 is in signal communication with a cellular network server 120, via signal paths 122, 124 and 126, respectively. The cellular network server 120 is generally a switching network server that may include telecommunication switches (not shown) and a central office (not shown). The cellular network server 120 controls the operation of the base stations 106, 108 and 110 and may assign individual cellular identification values to the base stations 106, 108 and 110 corresponding to the identification values for cells 100, 102 and 104.

These identification values may then be transmitted via a two-way channel or a broadcast channel to individual wireless devices (such as wireless device 118) located in the cellular network and utilized for identifying the location of the wireless device 118 relative to a specific cell. As an example, when the base station 106 broadcasts a cellular identification value (also known as a "cellular tag" or "cell ID") for cell 100, wireless device 118 would receive the broadcast signal and respond to base station 106 identifying itself as wireless device 118 located within the coverage area of cell 100. This identification may take place at any time when the wireless device 118 and base station 106 are communicating such as in the initial cellular handshake procedure or at a later time. Accordingly, after the wireless device 118 and base station 106 exchange this information, the wireless device 118 contains the cell ID and the base station 106 contains an identifier of the wireless device 118.

As another example, when base stations 106, 108, 110 broadcast their cellular identification value (also known as a "cellular tag") for the cells 100, 102 and 104, the wireless device 118 would receive the broadcast signals. These signals are sent through the base station 106 (through which it is communicating) identifying itself as wireless device 118 located within the coverage area of cell 100. This identification may take place at any time when the wireless device 118 and base station 106 are communicating such as in the initial cellular handshake procedure or at a later time. During this exchange of information, the cellular network server 120 registers the wireless device 118 as being within cell 100 and communicating via base station 106. The registration of the wireless device 118 may involve storing or linking the cell ID of the base station 106 (and cell 100) with the identifier of the wireless device 118 in a database within the cellular network. When the wireless device 118 moves into another cell, the cellular network would update its database to link the wireless device 118 to the cell ID of the cell it entered into. In examples of systems and methods for aiding positioning systems consistent with the present invention, the cellular identification values may advantageously be used as approximate location aids for the wireless device 118.

Figure 2:
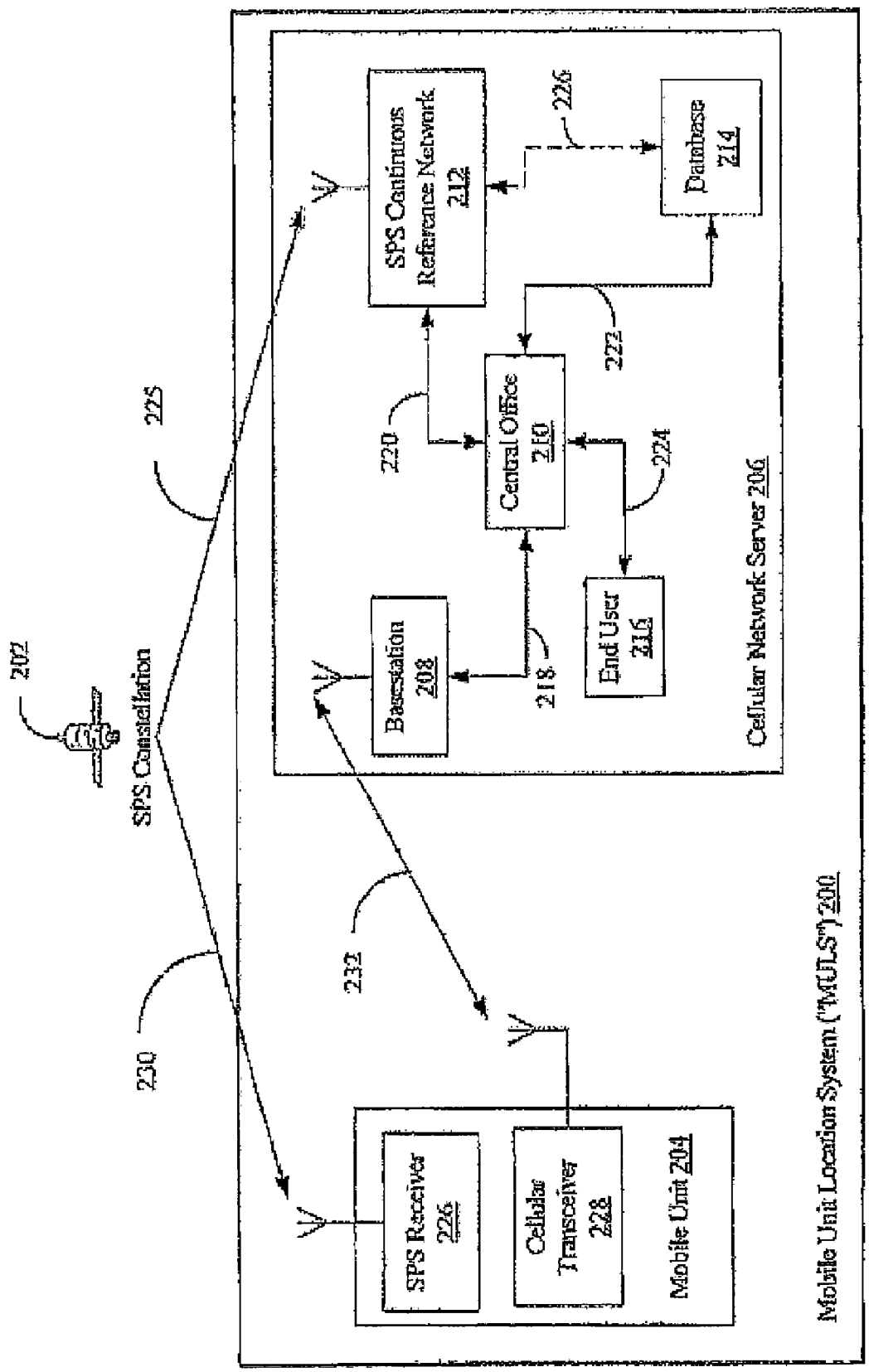
FIG. 2 is a block diagram of a portion of the system illustrated in FIG. 1.

FIG. 2 is a block diagram illustrating an example of an implementation of a mobile unit location system ("MULS") 200, which may receive SPS signals from a SPS constellation 202. The MULS 200 may include a mobile unit (i.e., a wireless device) 204 and a cellular network server 206. The cellular network server 206 may include a base station 208, a central office 210, an SPS continuous reference network 212, a database 214, and an end user 216. The base station 208 may also be optionally independent of the cellular network server 206. The central office 210 is in signal communication with the base station 208, SPS continuous reference network 212, database 214 and end user 216 via signal paths 218, 220, 222 and 224, respectively. Additionally, the SPS continuous reference network 212 may be optionally in signal communication with the database 214 via optional signal path 226.

The base station 208 is a fixed device that may include a cellular tower and the associated equipment with which the mobile unit 204 may communicate. The base station 208 communicates with a landline telephone network (whether private or public) such as the plain old telephone service ("POTS"). The central office 210 (also known as a "public exchange") is generally a facility where lines of a subscriber are joined to switching equipment for connecting with other subscribers whether locally, or by long distance. The SPS continuous reference network 212 is a fixed device and associated equipment for receiving SPS signals from the SPS constellation 202 via signal path 225. The database 214 may store location information of the mobile unit 204 with associated information of a cell. The associated information of a cell may include the cellular identification of the cell, as well as characteristic information of the cell measurable by a mobile unit in the cell such as signal strength, bit error rate (BER), propagation delay and/or multipath of the signal transmitted by the base station to the mobile unit within the cell, the number of fingers in a rake receiver and their relative delays and phases, and the like. In addition, in accordance with implementations described below, the database 214 may also include estimated parameters of one or more cells, such as the mass center and radius of a cell. Such parameters may be updated over time, and may be utilized for estimating the position of a mobile unit within the cell such as the mobile unit 204. The end user 216 may be any end user such as a program, application, utility, subsystem or actual individual that desires the location information of the mobile unit 204 including a user of the mobile unit 204.

The mobile unit 204 may include a SPS receiver 226 and a cellular transceiver 228. The SPS receiver 226 receives SPS signals from the SPS constellation 202 via signal path 230 and the cellular transceiver 228 is in signal communication with the base station 208 via signal path 232. Examples of the SPS receiver 226 include the SiRFstarI, SiRFstarII and SiRFstarIII GPS receivers produced by SIRF Technology, Inc. of San Jose, Calif., the GPSOne GPS receiver produced by Qualcomm Incorporated of San Diego, Calif., or any other GPS receiver capable of operation within the mobile unlit 204. The cellular transceiver 228 (also known as "call processing function") may be any radio frequency ("RF"), Amps, FDMA, TDMA, GSM, CDMA, W-CDMA, CDMA-2000 or UMTS type transceiver.

Figure 3:
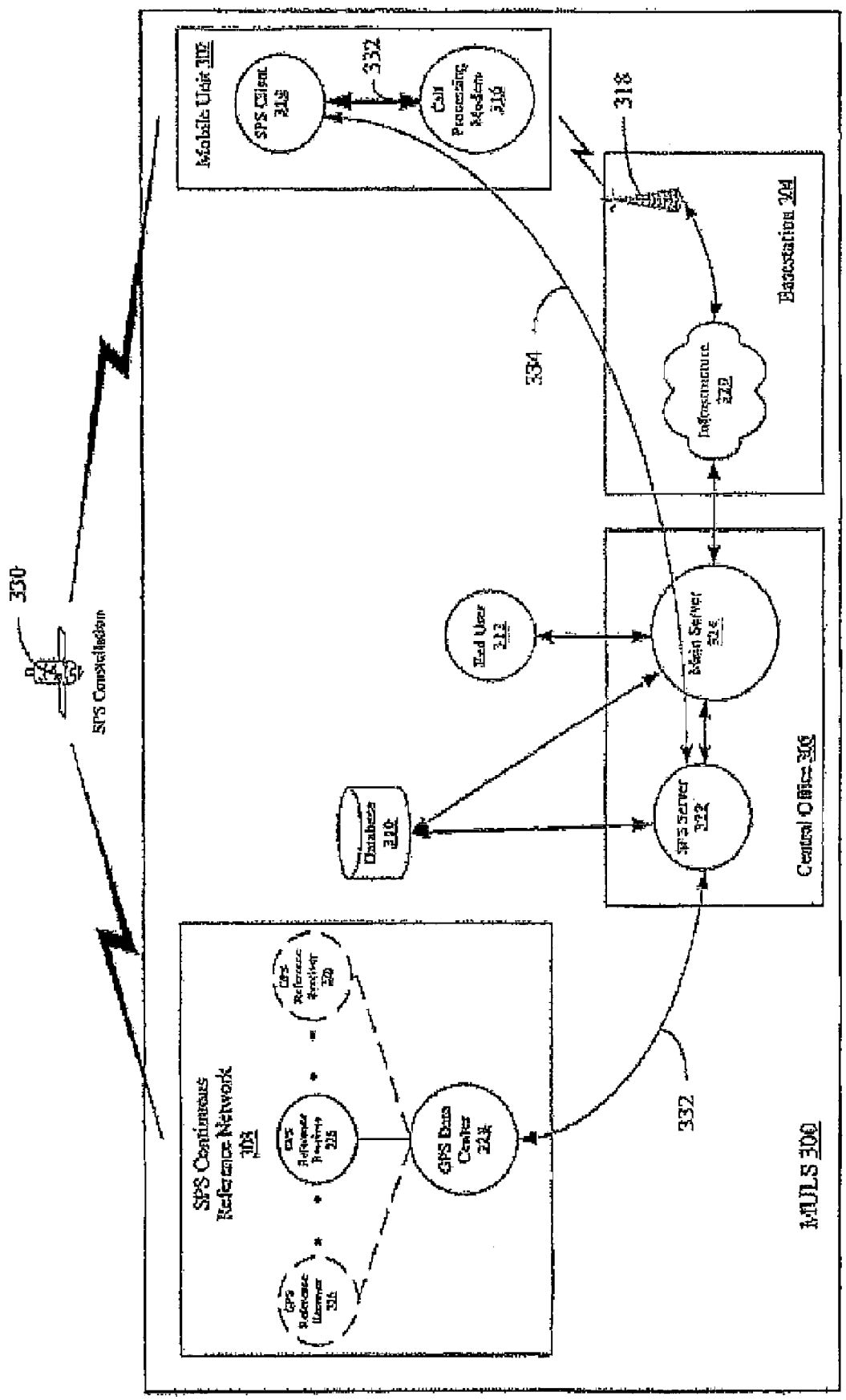
FIG. 3 is a block diagram of the system in FIG. 1 illustrating operation of a positioning system and a wireless communications system.

FIG. 3 is a block diagram illustrating a simplified example of an implementation of the MULS 300 in a typical cellular telephone environment. The MULS 300 includes a mobile unit 302, a base station 304, central office 306, SPS continuous reference network 308, database 310 and end user 312. The mobile unit 302 may include a SPS client 314 such as a SiRFLoc client and a call processing function 316 such as a RF, Amps, FDMA, TDMA, GSM, CDMA, W-CDMA, CDMA-2000 or UMTS type transceiver. The base station 304 includes the fixed device such as radio tower 318 and the associated infrastructure 320. The central office 306 includes an SPS server 322 such as SiRFLoc server and a central office server 324. As an example, the central office server 324 may include a Serving Mobile Location Center (SMLC)/Global Mobile Location Center (GMLC) as defined in the wireless location standard for GSM. The central office server 324 may include switching components and electronics for performing the wireless telecommunications functions of the central office 306. The SPS continuous reference network 308 includes a SPS reference receiver 326 and a SPS data center 328. The SPS continuous reference network 308 and the mobile unit 302 both receive SPS signals from the SPS constellation 330.

As an example of operation, the SPS continuous reference network 308 collects data, from the SPS constellation 330 in the system coverage area in real-time, and stores collected data locally in a memory unit (not shown) within the SPS continuous reference network 308. Based oil the coverage area, multiple reference receivers 326 may be used in the system. Periodically, the SPS server 322 polls, via signal path 332, the data from the SPS continuous reference network 308 related to the SPS client 314, and caches it in its internal memory unit (not shown) in the SPS server 322, so that it may be reused for another SPS client (not shown) without polling it again if it is relevant to subsequent SPS clients (not shown). This information is then transmitted to the SPS client 314 via signal path 334, which is the signal path through the central office 306, base station 304 and call processing function 316.

It is appreciated that the combining of cellular identification information with the mobile unit 302 location may take place either within the SPS subsystem (i.e., the SPS client) 314 or within the call processing function 316 or even in the SPS server 322. In the one example, the cellular identification information is transferred from the call processing function 316 to the SPS client 314 and tagged to the computed position (i.e., latitude, longitude and altitude data). In another example, the location from the SPS client 314 is sent to the call processing function 316 where it is tagged to the cellular identification information. This tagged data is then sent as a message, over the wireless network, to database 310 where it is stored. In a third example, the location from the SPS client 314 and the cellular identification information are received as different messages from the same SPS client 314 during the same geolocation session, and associated together at the SPS server 322.

The MULS 300 advantageously provides the mobile unit 302 with additional surrounding information (i.e., an approximate location aid) from the database 310. As a result of providing this approximate location aid, a SPS receiver may be jump-started to provide position information for the mobile unit 302 more quickly. Knowing the approximate location of the mobile unit 302 also helps the mobile unit 302 expedite its location calculations.

Three general situations may apply to a given mobile unit located in a given cell when the mobile unit or a remote party desires to how the position of the mobile unit. First, the GPS location of the mobile unit may be available due to, for example, the proper functioning of the GPS components embedded with the mobile unit. In this case, the mobile unit does not require positioning assistance. Second, GPS location information may be available, but is determined to be unreliable due to inaccuracy or uncertainty. In this case, the mobile unit may require position assistance information if the position assistance information available at the time is determined to be more reliable than the GPS location information. Third, the GPS location of the mobile unit may be not available at all due to, for example, a failure of the GPS components embedded with the mobile unit. In this case, the mobile unit requires position assistance information to calculate its position. In the implementations described by way of example below and illustrated in the drawings, position assistance information may include the estimated center of the cell in which the mobile unit is located. The actual location of the center of a cell is not needed to provide cell ID based positioning. Likewise, the actual location of the base station is not needed. As previously noted the base station may not be located at the center of the cell and thus is not necessarily the best estimate of the location of a mobile device within the cell. Thus, the implementations described and illustrated below are operative in situations where the location of the cell center is not available.

Figure 4:
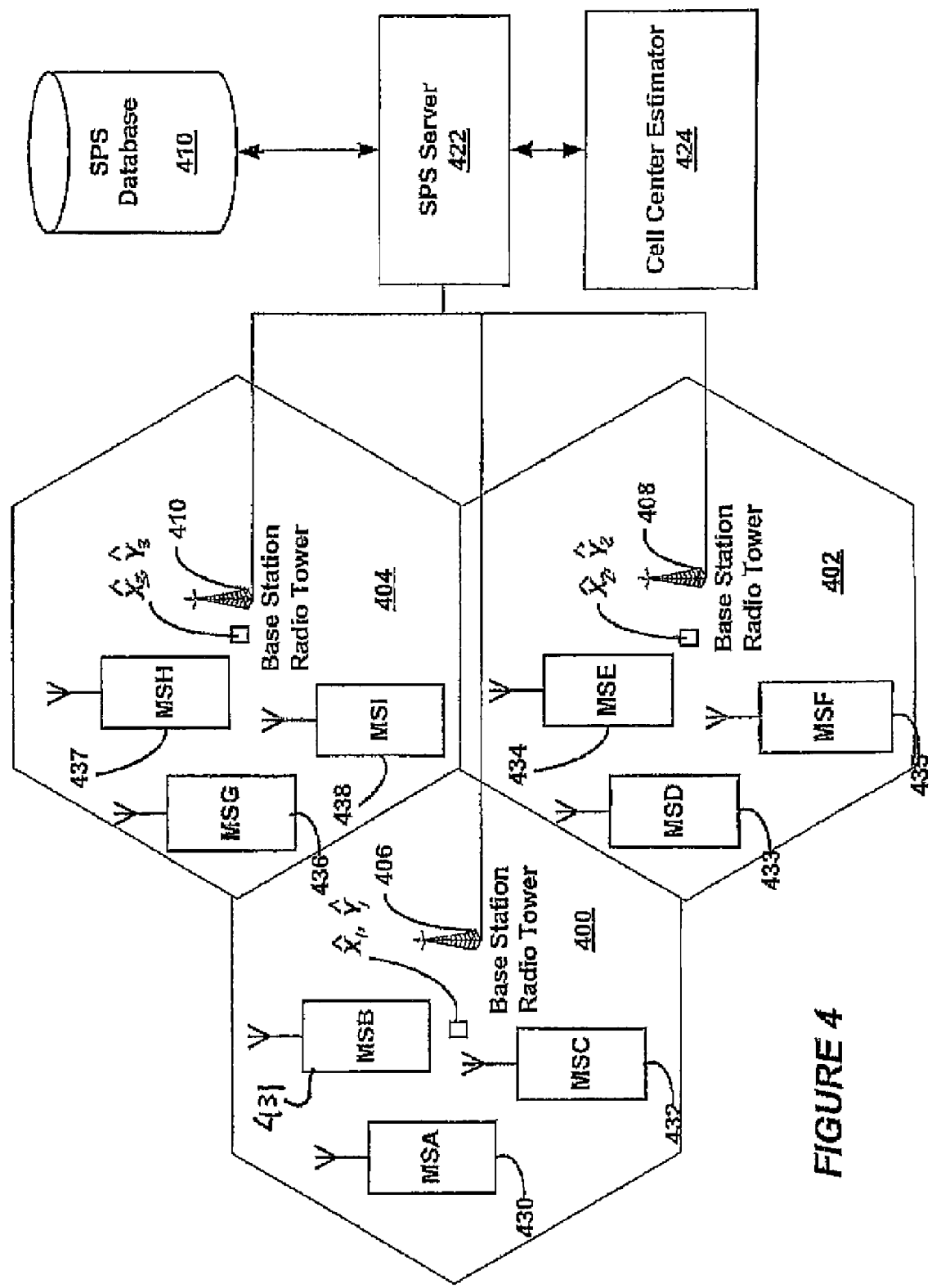
FIG. 4 is a block diagram of a portion of the system illustrated in FIG. 1 that implements examples of systems and methods for estimating a cell center in a wireless communication system.

FIG. 4 is a schematic diagram illustrating use of systems and methods for estimating cell center locations to acquire coarse location estimates to an SPS receiver that is unable to obtain its position with suitable accuracy and precision, or is attempting to locate itself on startup. The diagram in FIG. 4 shows three adjacent cells, a first cell 400, a second cell 402, and a third cell 404. Each cell is serviced by a first base station 406 in the first cell 400, a second base station 408 in the second cell 402, and a third base station 410 in the third cell 404.

The base stations 406, 408, 410 provide service to the mobile stations in their respective cells. The first base station 406 provides service to mobile stations MSA 430, MSB 431, and MSC 432 in cell 400. The second base station 408 provides service to mobile stations MSD 433, MSE 434, and MSF 435 in cell 402. The third base station 410 provides service to mobile stations MSG 436, MSH 437, and MSI 438 in cell 404. Each base station 406, 408, 410 may be connected via a variety of signal paths and combinations of signal paths (some of which are described above with reference to FIGS. 1-3) to a SPS server 422. The SPS server 422 includes an interface to a SPS database 410 and an interface to a cell center estimator 424. The SPS server 422 may receive location information and cell ID information from the mobile stations in the cells as described above with reference to FIGS. 1-3. The SPS database 410 may receive and store the location information including cell ID information for each mobile station in each cell. The location and cell ID information in the SPS database 410 may be accessed and used by a cell center estimating function to estimate the location of the center of the cell.

In examples of systems and methods for estimating cell center locations, the SPS database 410 may include data for each mobile station in each cell serviced by the SPS server 322. Table 1 shows examples of the data that may be included in the SPS database 410.

TABLE 1

| Mobile Station Id | Mobile Station Position | Horizontal Variance ($V_j$) | Cell Identifier | Estimated Cell Center Location | Cell Radius |
|---|---|---|---|---|---|
| MSA | $x_0, y_0$ | $\begin{bmatrix} \sigma^2_{N,0} & \sigma^2_{NE,0} \\ \sigma^2_{NE,0} & \sigma^2_{E,0} \end{bmatrix}_{j=0}$ | $C_1$ | $\hat{X}_1, \hat{Y}_1$ | R1 |
| MSB | $x_1, y_1$ | $\begin{bmatrix} \sigma^2_{N,1} & \sigma^2_{NE,1} \\ \sigma^2_{NE,1} & \sigma^2_{E,1} \end{bmatrix}_{j=1}$ | $C_1$ | $\hat{X}_1, \hat{Y}_1$ | R1 |
| MSC | $x_2, y_2$ | $\begin{bmatrix} \sigma^2_{N,2} & \sigma^2_{NE,2} \\ \sigma^2_{NE,2} & \sigma^2_{E,2} \end{bmatrix}_{j=2}$ | $C_1$ | $\hat{X}_1, \hat{Y}_1$ | R1 |
| MSD | $x_3, y_3$ | $\begin{bmatrix} \sigma^2_{N,3} & \sigma^2_{NE,3} \\ \sigma^2_{NE,3} & \sigma^2_{E,3} \end{bmatrix}_{j=3}$ | $C_2$ | $\hat{X}_2, \hat{Y}_2$ | R2 |
| MSE | $x_4, y_4$ | $\begin{bmatrix} \sigma^2_{N,4} & \sigma^2_{NE,4} \\ \sigma^2_{NE,4} & \sigma^2_{E,4} \end{bmatrix}_{j=4}$ | $C_2$ | $\hat{X}_2, \hat{Y}_2$ | R2 |
| MSF | $x_5, y_5$ | $\begin{bmatrix} \sigma^2_{N,5} & \sigma^2_{NE,5} \\ \sigma^2_{NE,5} & \sigma^2_{E,5} \end{bmatrix}_{j=5}$ | $C_2$ | $\hat{X}_2, \hat{Y}_2$ | R2 |
| MSG | $x_6, y_6$ | $\begin{bmatrix} \sigma^2_{N,6} & \sigma^2_{NE,6} \\ \sigma^2_{NE,6} & \sigma^2_{E,6} \end{bmatrix}_{j=6}$ | $C_3$ | $\hat{X}_3, \hat{Y}_3$ | R3 |
| MSH | $x_7, y_7$ | $\begin{bmatrix} \sigma^2_{N,7} & \sigma^2_{NE,7} \\ \sigma^2_{NE,7} & \sigma^2_{E,7} \end{bmatrix}_{j=7}$ | $C_3$ | $\hat{X}_3, \hat{Y}_3$ | R3 |
| MSI | $x_8, y_8$ | $\begin{bmatrix} \sigma^2_{N,8} & \sigma^2_{NE,8} \\ \sigma^2_{NE,8} & \sigma^2_{E,8} \end{bmatrix}_{j=8}$ | $C_3$ | $\hat{X}_3, \hat{Y}_3$ | R3 |

In Table 1, the Mobile Station Id may be any suitable identifier that uniquely identifies the mobile stations in each cell. The Mobile Station Id is shown symbolically as MSA, MSB, MSC, MSD, MSE, MSF, MSG, MSH, and MSI in Table 1. Actual Id is may include the mobile station cellular telephone number assigned to each mobile station, an IP address, or any other suitable identifier. The mobile station position in Table 1 includes latest positions calculated for each mobile station. Each mobile station shown in Table 1 includes a SPS client and operates in the positioning system as described above. During operation, the mobile station position is periodically updated by the SPS positioning system.

The SPS positioning system may also calculate a horizontal variance $V_j$ for the mobile station (j). The horizontal variance $V_j$ is the variance of the location of the mobile station j in a flat, two-dimensional (x,y) space defining the area of the cell relative to its true position. The horizontal variance may be calculated as a 2×2 symmetrical matrix including an SPS positioning variance along the north axis (i.e. $\sigma_N^2$), an SPS positioning variance along the east axis (i.e. $\sigma_E^2$), and a variance relative to both axes (i.e. $\sigma_{NE}^2$). The SPS positioning variances, $\sigma_N^2$, $\sigma_E^2$, $\sigma_{NE}^2$, are determined during acquisition of a location by the mobile stations and available when the mobile station locations become available.

Table 1 also includes a cell identifier, which may be a unique number, alphanumeric sequence, or other suitable symbol or token for identifying the cell. The Cell identifier may be provided by the wireless telecommunications system as described above.

Also as shown in Table 1, the database may include an estimated cell center location. The estimated cell center location is a calculated estimate of the cell center location, which is a center of the area serviced by the cell. The estimated cell center location may not be the exact true center of the service area of the cell; it may only be an approximation sufficiently accurate for use as an estimated location for a mobile station in the cell. In systems and methods for estimating the cell center location, the cell center estimator 424 uses the locations of mobile stations (as determined by the SPS positioning system) serviced by the cell to estimate the center of the cell as described below. The cell center estimator 424 may obtain the mobile station location from a database such as the SPS database 410.

The cell radius in Table 1 may be periodically calculated and/or updated each time an estimated cell location is determined. The cell radius may be calculated as one step in determining the estimated cell center location. The calculated cell radius may then be used as described below to determine a more accurate estimated cell location, which may be used to update the cell radius. The cell radius may be initially calculated without a starting cell center location by starting with the positions of all of the mobile stations in the cell and mapping an area covered by the mobile stations at the locations. A circle may be defined around the area that includes all of the mobile stations. The shape of the cell 504 is of no real significance. The actual shape of a cell is actually defined by the outward distances to which a cell is able to provide service to a mobile station. Cells may actually overlap in coverage. The cell shape is defined as circular as a first step in the process. An initial circle radius may be defined as a distance just greater than half of the largest distance between any two mobile stations.

During operation, the mobile station may not be able to obtain a position, whether not at all, or with a desired accuracy. Also, if the mobile station is turned off, or its positioning capability is disabled, the mobile station position in the database may not be accurate when the mobile station is re-initialized. Such a mobile station may take the last estimated cell center location and use it as its own location.

In FIG. 4, the cell center location for cell 1 is $\hat{X}_1, \hat{Y}_1$, the cell center location for cell 2 is $\hat{X}_2, \hat{Y}_2$, and the cell center location for cell 3 is $\hat{X}_3, \hat{Y}_3$. As described graphically in FIG. 4, the cell center locations do not coincide with the base stations. The following describes systems and methods for estimating a cell center location to set as the cell location, which may be used by a mobile station served by the cell as its location when the mobile station is unable to obtain its own location, or is initializing its positioning capabilities. As described below, the estimated cell center location is a derived location calculated from statistical measures of the mobile station locations in the cell. The statistical measures are based on assumptions about the distribution of the mobile stations in the cell. In one example below, the statistical measure selected for estimating a cell center location is a maximum likelihood mobile station location based on a Gaussian distribution for mobile station locations with a large variance. In another example, the mean of the mobile station locations is selected as the statistical measure. Those of ordinary skill in the art will appreciate that other measures may be used.

Figure 5A:
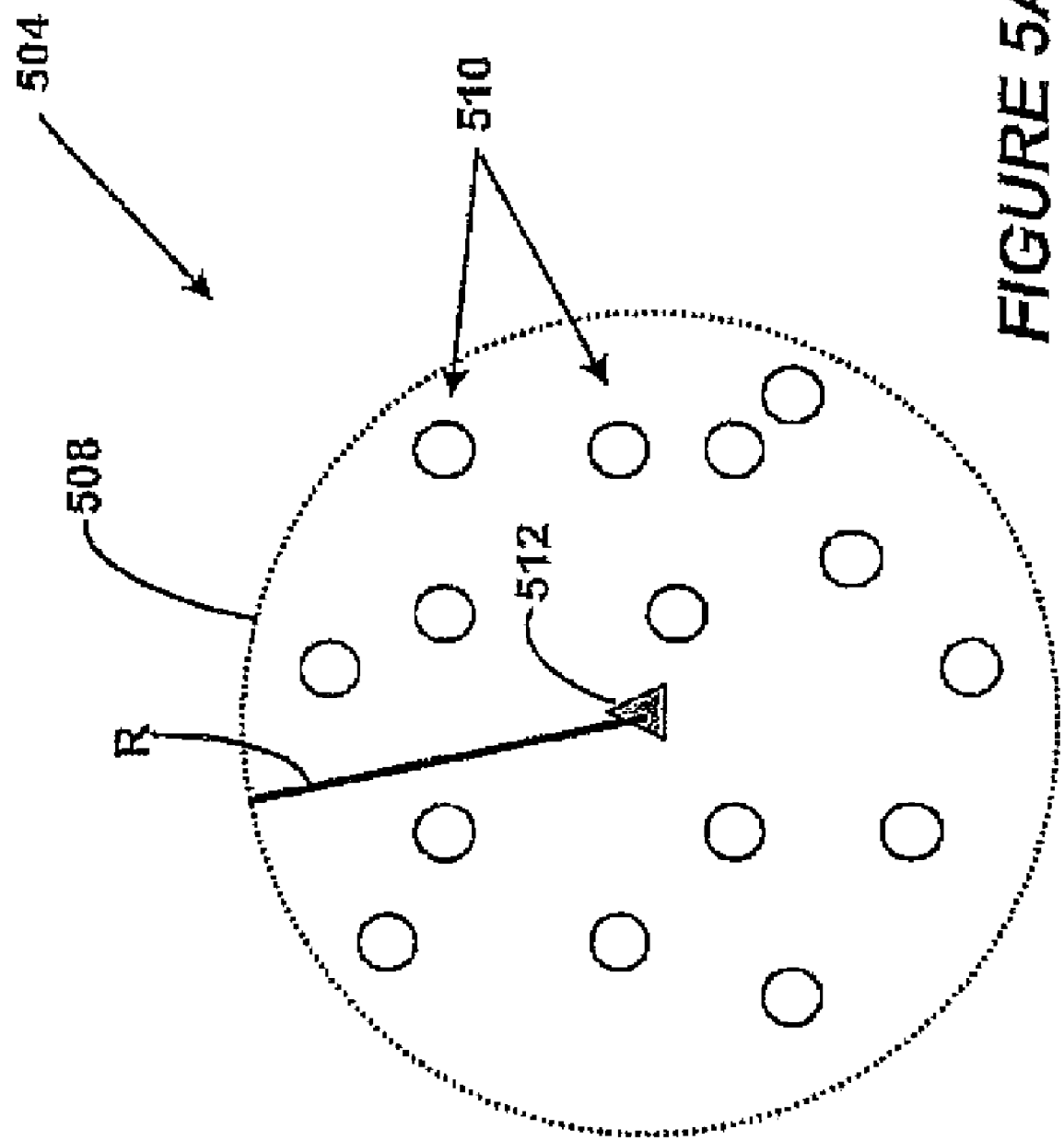
FIG. 5A is a schematic diagram illustrating an example of a method for estimating a cell center.

An example cell 504 is illustrated in FIG. 5A as a circle. For purposes of estimating a cell center position, a function (such as the cell center estimator 424 in FIG. 4) may obtain mobile station location data in a cell from a database such as the SPS database 410 in FIG. 4. The data for each mobile station served by a target cell (i.e. cell 504) may be retrieved and modeled as a circle as shown in FIG. 5 in which the perimeter of the circle is a cell border 508, the center of the circle is an estimated cell center (or cell location) 512, and the small circles inside the cell border 508 are mobile stations 510 served by the cell contained in the cell border 508, where each mobile station 510 is also all SPS receiver. The radius R in FIG. 5 is the initial cell radius calculated as described above. The mobile stations 510 are assumed to be uniformly distributed within the cell border 508. Thus, the SPS position estimate for each mobile station is assumed to be a Gaussian distribution with the true position being the mean with a variance $V_j$.

In accordance with the notation below, j is a mobile station (i.e. SPS receiver) and i identifies a cell. The initial radius of the cell is $r_0$ in the equations below. The positions of the SPS receivers are defined as x, y coordinates along north and east axes. The variance $V_{ij}$ of the true position of a SPS receiver relative to an estimated cell center may be calculated as follows.

$$V_{ij} = \begin{bmatrix} \sigma_{ij}^2 & 0 \\ 0 & \sigma_{ij}^2 \end{bmatrix} + V_j \quad (1)$$

The value $\sigma_{ij}^2$ is the variance of the SPS receiver's true position relative to the true cell center. The value $\sigma_{ij}^2$ may be determined in a variety of ways. The true value of $\sigma_{ij}^2$ in a given cell may be assumed to be relatively large since very little is known about the true position of the cell center. In one example, $\sigma_{ij}^2$ may be defined to be $\sigma_{ij}^2 = (r_0/2)^2$. The variance $V_j$ is a 2×2 matrix that may be retrieved from the database (all example of which is shown in Table 1). The equation for $V_{ij}$ then becomes:

$$V_{ij} = \begin{bmatrix} (r_{oij}/2)^2 & 0 \\ 0 & (r_{oij}/2)^2 \end{bmatrix} + V_j \quad (2)$$

Based on Eq. (2), the estimated cell center location $X_{ci}$ may be determined to be the maximum likelihood location according to:

$$\hat{X}_{ci} = \left[\sum_{j=1}^{N} V_{ij}^{-1}\right]^{-1} \sum_{j=1}^{N} [V_{ij}^{-1} \hat{X}_j] \quad (3)$$

where $\hat{X}_j$ is the true position of each mobile station j, assumed to be the position calculated by the SPS positioning system.

Equations (2) and (3) may be re-written to provide an approximate accuracy for the estimate of the position based on a certain number of SPS receivers, or to calculate the number of SPS receivers needed to achieve a certain accuracy of the cell location estimate (which is also the coarse location accuracy when SPS signal is not available).

$$\text{If } \sigma_{ij}^2 \gg \sigma_N^2 \text{ and } \sigma_{ij}^2 \gg \sigma_E^2, \quad (4)$$

$$V_{ij} = \begin{bmatrix} \sigma_{ij}^2 & 0 \\ 0 & \sigma_{ij}^2 \end{bmatrix} + V_j \approx \begin{bmatrix} \sigma_{ij}^2 & 0 \\ 0 & \sigma_{ij}^2 \end{bmatrix}$$

Then, the cell location call be approximated using the mean mobile station location and sample variance as:

$$\hat{X}_{ci} \approx \frac{1}{N} \sum_{j=1}^{N} \hat{X}_j \quad (5)$$

$$\text{var}(\hat{X}_{ci}) \approx \frac{1}{N} \begin{bmatrix} \sigma_{ij}^2 & 0 \\ 0 & \sigma_{ij}^2 \end{bmatrix} \quad (6)$$

The variance in one axis given the assumption above for Equation (4) is:

$$\sigma_{ci}^2 \approx \frac{1}{N} \sigma_{ij}^2 \quad (7)$$

or $$\sigma_{ci} \approx \frac{\sigma_{ij}}{\sqrt{N}} \quad (8)$$

The number of mobile stations needed in a cell to estimate the cell center to a desired accuracy may be determined using:

$$N \approx \left(\frac{\sigma_{ij}}{\sigma_{ci}}\right)^2 \qquad (9)$$

The equations (1)-(5) above may be implemented in hardware/software functions, For example, the cell center estimator 424 that may operate in the SPS server 422 as shown in FIG. 4, for example. The cell center estimator 424 may operate as part of the SPS server 422 or in communication with the SPS server 422. The cell center estimator 424 may operate periodically to keep the estimated cell center location updated as the number of GPS receivers increases or decreases within the cell. In one example, the cell center estimate is updated along with an approximation of the accuracy of the estimate. The estimated location may then be updated when the approximate accuracy increases beyond the previously calculated accuracy.

Figure 5B:
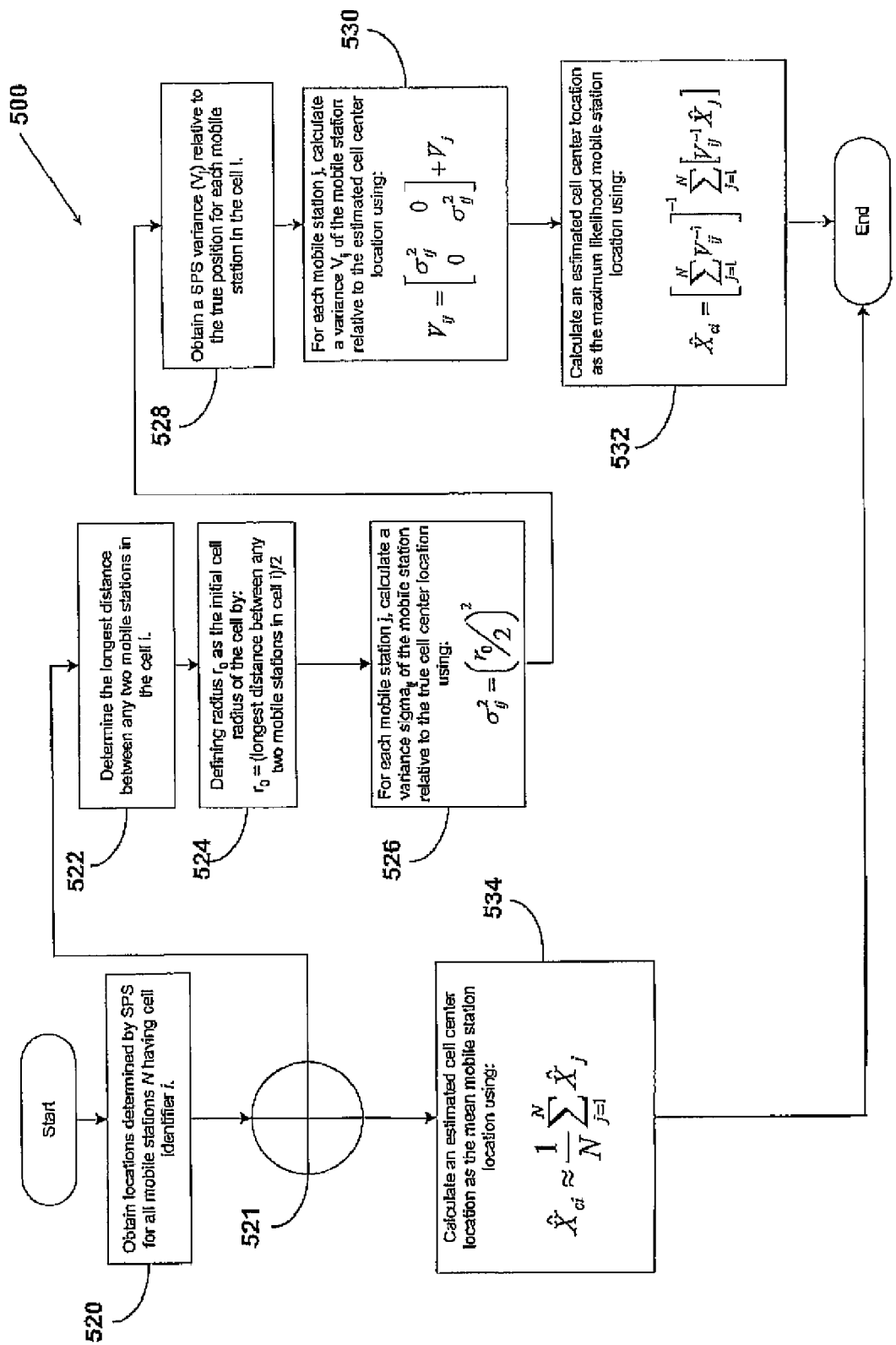
FIG. 5B is a flowchart of an example of a method for estimating a cell center location.

FIG. 5B is a flowchart of an example of a method 500 for determining an estimated cell center location. The method 500 in FIG. 5B may be performed in software by a function such as the cell center estimator 424 with access to an SPS database with a structure similar to that shown in Table 1. In the method 500, the locations of each of N mobile stations in the cell of interest (i) as determined by the SPS positioning system are accessed as shown in step 520. The mobile station locations may be accessed from a database, such as the SPS database 410 described above with reference to FIG. 4. FIG. 5B includes all OR function block 521 indicating that the method may proceed in one of two ways. The method may continue from Step 520 to Step 522 or from Step 520 to Step 534. Examples of the method 500 in FIG. 5B may include both paths, or one or the other. If the method 500 proceeds to Step 522, the longest distance between any two mobile stations is determined in Step 522. The longest distance may be determined by calculating the distance between all of the mobile stations and selecting the largest distance. The two mobile stations that are farthest from each other may be assumed to be at opposite edges of the cell. In step 524, an initial cell radius is defined as half the distance between the two mobile stations that are farthest from each other. In step 526, the initial radius of the cell is used to calculate the value $\sigma_{ij}^2$, which is the variance of the SPS receiver's true position relative to the true cell center. This value is determined for each mobile station in the cell. In step 528, the SPS variance relative to the true position for each mobile station in the cell ($V_j$) may be retrieved from the database. At step 530, the variance $V_{ij}$ of the mobile station relative to the estimated cell center location is calculated using, for example, equation (2) above for each mobile station. In step 532, the variance $V_{ij}$ for each mobile station, and the location of each mobile station ($\hat{X}_j$) are used to calculate the estimated cell center location using equation (3) above, which calculates the maximum likelihood mobile station location in the cell.

If at OR function block 521 the method 500 proceeds to step 534, then the mobile station locations obtained in Step 520 are used to calculate a mean mobile station location according to Equation (5) above. Additional steps may be performed to determine the accuracy given the number of mobile station locations used, or to determine the number of mobile stations required to obtain a desired accuracy as described above in Equations (8) and (9).

Figure 6A:
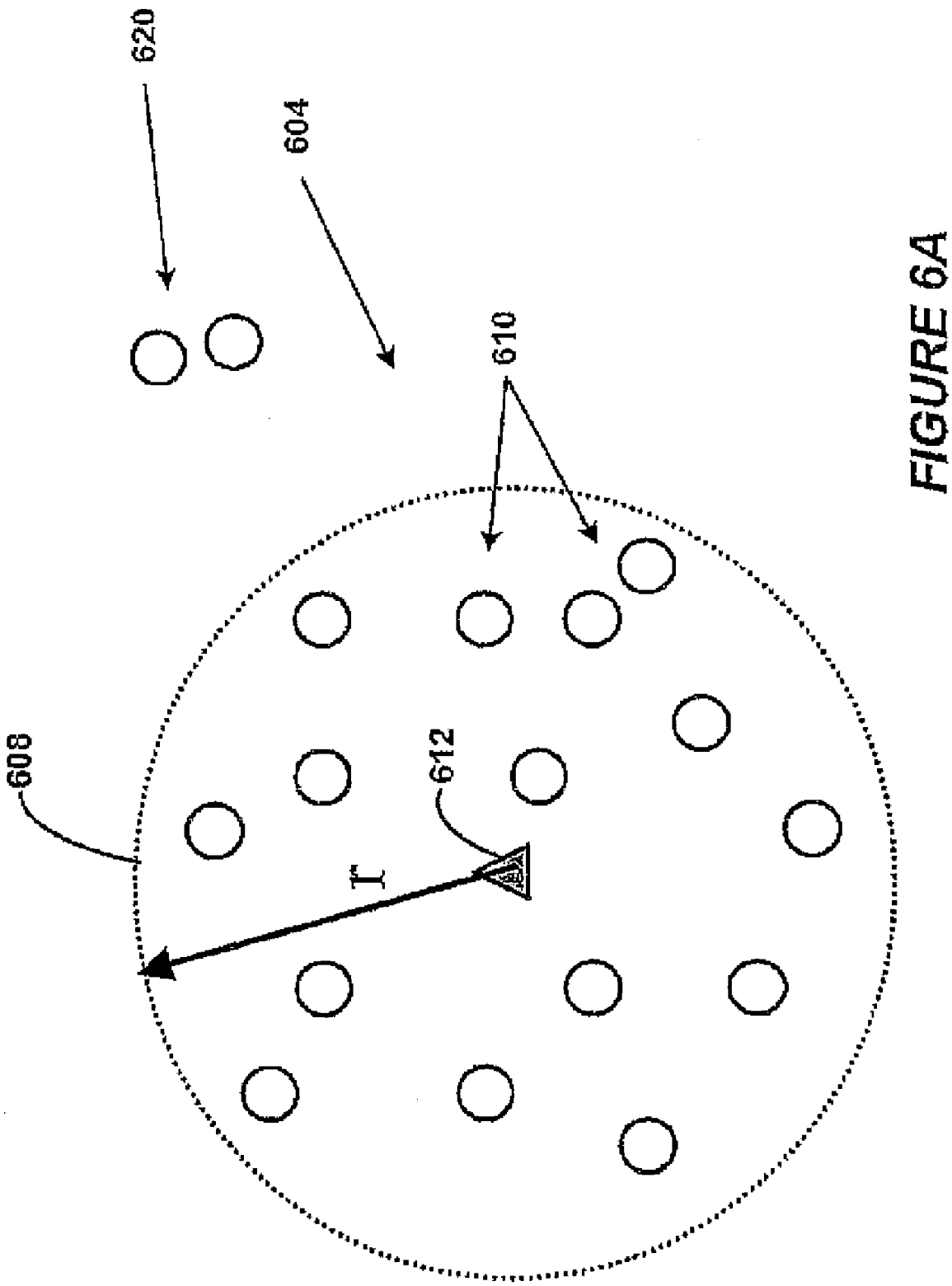
FIG. 6A is a schematic diagram illustrating another example of a method for increasing accuracy of an estimated cell center location.

The estimate of the cell center location may be made more accurate by filtering the mobile station locations used in estimating the cell center location to exclude mobile station locations that may not fit with the assumption that the mobile stations are uniformly distributed. FIG. 6A shows one example of a mobile station location filter in which a cell 604 is again illustrated as a circle 608 having a radius 'r' (which may be $r_0$) and containing mobile stations 610 served by the cell. An initial cell center estimate 612 at the center of the circle 608 may be determined using examples of methods described above with reference to FIGS. 5A & 5B. In an example of a method for increasing the accuracy of the cell center estimate, a more accurate cell center estimate may be determined by redefining the circle 608 with a minimum radius 'r' that would encircle a certain percentage of the mobile stations 610 served by the cell 504. The percentage may be selected according to a desired accuracy level in view of Equation (9) above for the number 'N' of mobile stations required to obtain a desired accuracy level. In the method illustrated by FIG. 6A, reducing the coverage area may eliminate the effect that outliers may have on the accuracy of the cell center estimate. Outliers would include outlier mobile stations 620 that are sufficiently far from the rest of the mobile stations that the positions would make the distribution of the mobile stations less uniform.

Figure 5C:
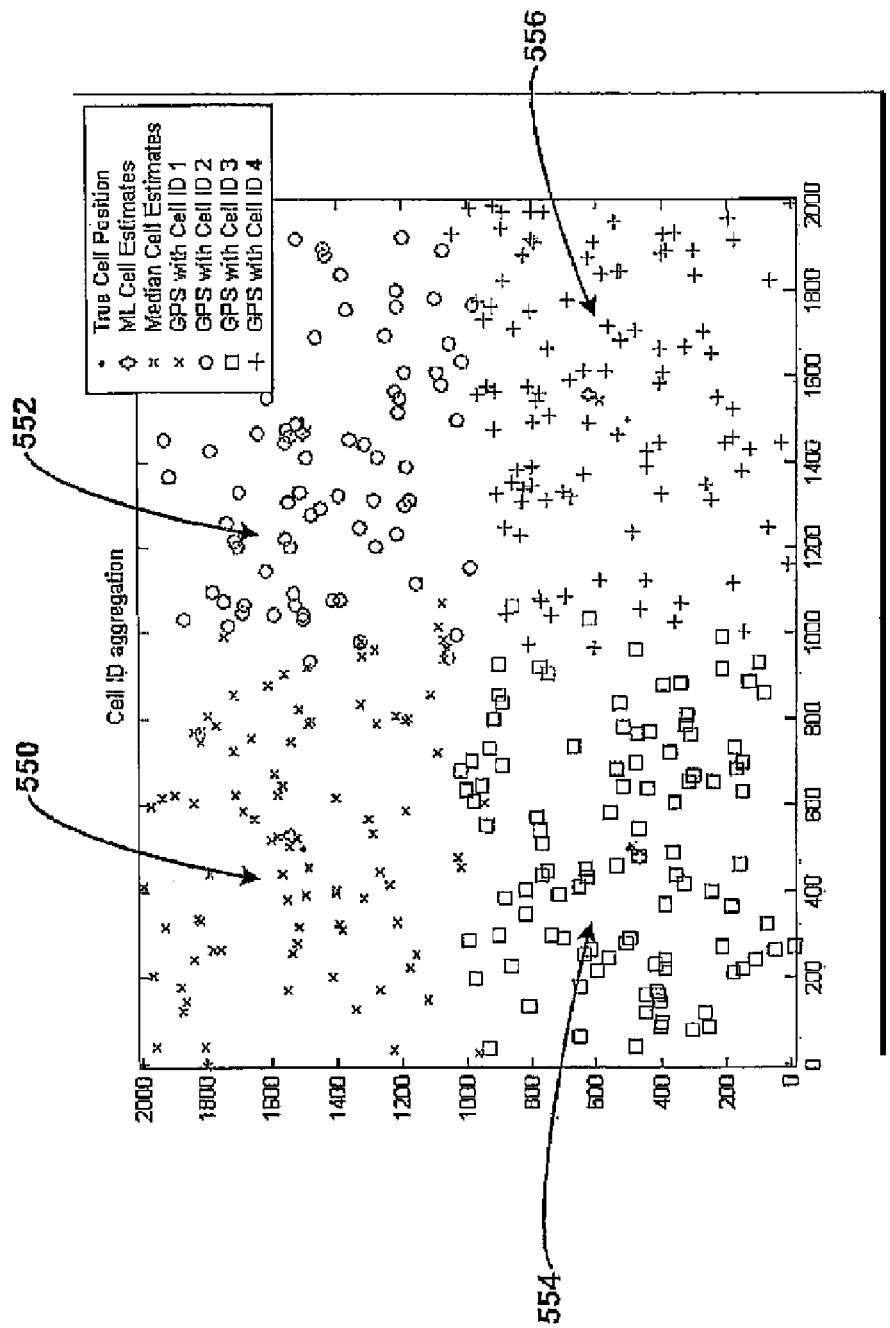
FIG. 5C is an example of an X-Y graph showing locations of mobile stations in four example cells.

FIG. 5C shows an X-Y graph showing example mobile stations locations plotted oil X-Y coordinates for four example cells. The cells in FIG. 5C are a first cell 550, a second cell 552, a third cell 554 and a fourth cell 556. The legend indicates where in the graph are located: a true cell position (for each of the four cells), a maximum likelihood cell estimate, the GPS locations for mobile stations in the first cell 550, the GPS locations for mobile stations in the second cell 552, the GPS locations for mobile stations in the third cell 554, and the GPS locations for mobile stations in the fourth cell 556. The graph in FIG. 5C illustrates how mobile station locations may be mapped in cells In the example shown in FIG. 6A, the radius is minimized so as to cover a percentage (e.g. 95%) of the mobile stations (i.e. SPS receivers) in the cell 604. As shown in FIG. 6A, a radius 'r' may be defined by determining the distance of each of the mobile stations from the initial cell center estimate 612 using the mobile station location information. An initial radius 'r' may be defined as the distance from the initial estimated cell center to the most distant mobile station. The radius may then be reduced and compared with the distances of the mobile stations until the desired percentage of mobile stations are within a minimum radius. The locations of the mobile stations within the circle defined by the minimum radius 'r' may then be used in the equations above to determine another cell center estimate. The process may be periodically performed to adjust the cell center estimate to be more accurate. If the cell radius is stored in the database, the cell radius may be updated each time the cell center estimate is adjusted.

Figure 6B:
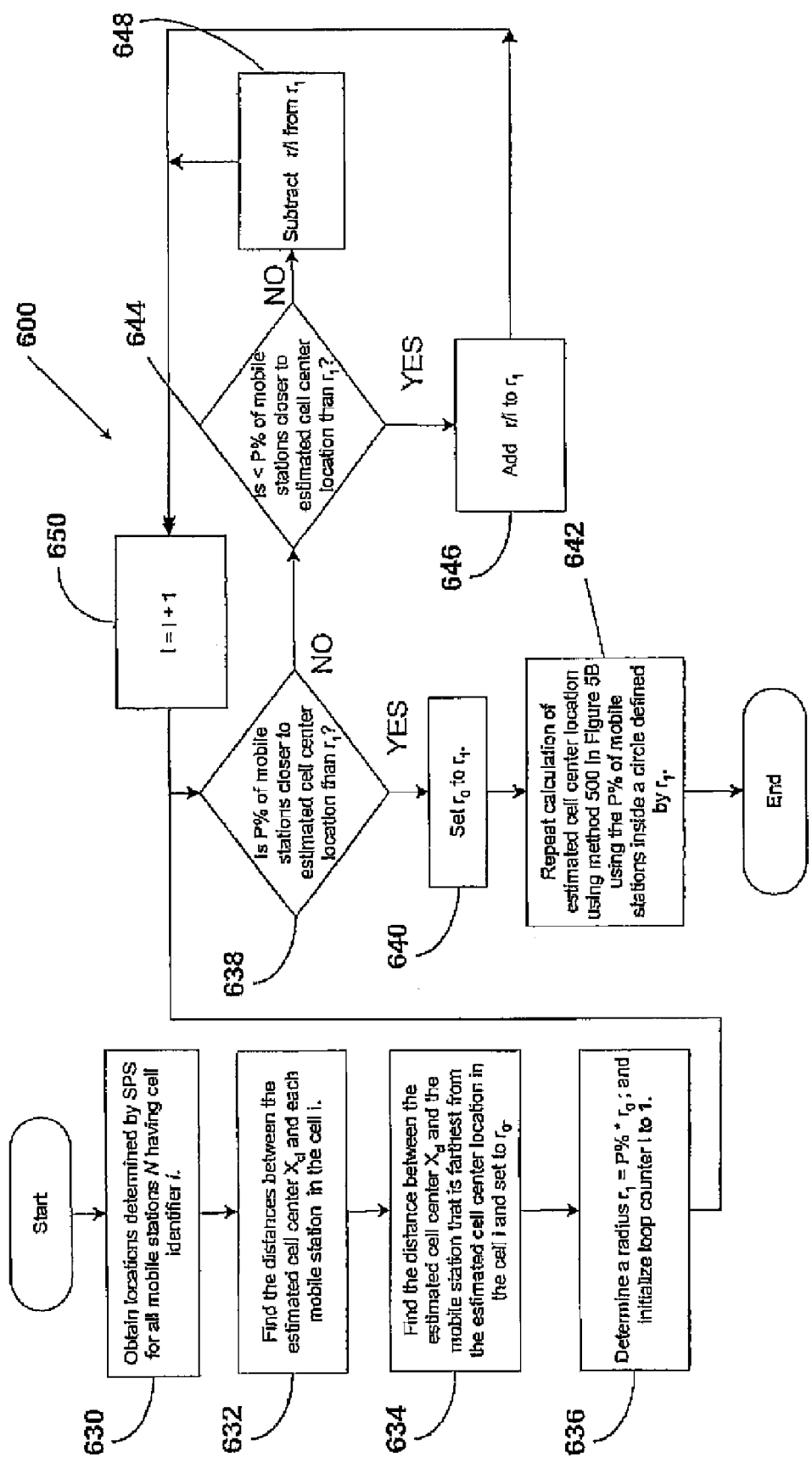
FIG. 6B is a flowchart of another example of a method for estimating a cell center location.

FIG. 6B is a flowchart of a method 600 for obtaining a more accurate estimate of the cell center location. The method 600 illustrated by in FIG. 6B may be performed in the cell center estimator 424 (in FIG. 4) and may be performed subsequent to the method 500 illustrated in FIG. 5B. The method 600 includes step 630 in which the locations (as determined by the SPS positioning system) of all N mobile stations may be retrieved from a storage element (such as a database with a structure similar to that of Table 1). At step 632, the method determines the distance of each mobile station from the estimated cell center $X_{ci}$ as calculated for example, by using method 500 in FIG. 5B. At step 634, the method 600 searches for the distance between the estimated cell center location and the mobile station that is farthest away from the estimated cell center location. This distance is defined as the new initial cell radius ($r_0$). In step 636, a minimized cell radius ($r_1$) is calculated as $r_1 = P\%$ of $r_0$ and in step 636, or in a separate step, a loop counter is initialized to 1. At decision block 638, a test is performed to determine if the circle defined by radius r1 encompasses P % of the mobile stations in the cell. If the test determines that YES, P % of the mobile stations are in the circle defined by $r_1$, then the cell radius $r_0$ is set to $r_1$ at step 640. At step 642, the calculation of the estimated cell center as performed using method 500 in FIG. 5B is repeated using the new cell radius $r_1$.

If at decision block 638, P % of the mobile stations in the cell are not within the circle defined by $r_1$, then at decision block 644 a second test is performed to determine if fewer than P % of the mobile stations in the cell are within the circle defined by $r_0$. If fewer than P % of the mobile stations are within the circle defined by $r_1$, then $r_1$ is increased by a predetermined value $\Delta r/1$ at step 646 to make the circle bigger. If decision block 644 determines that the number of mobile stations in the circle defined by $r_1$, is not fewer than P % of the mobile stations then it is greater than P % of the mobile stations. At step 648, the radius is decreased by a value $\Delta r/1$. The method 600 in FIG. 6B may loop at decision blocks 638 and 644 so that it may take many passes through decision blocks 638 and 644 to get to a radius for a circle that encompasses P % of the mobile stations. The loop counter, l, is incremented at step 650 each time the loop is executed to decrease the incremental amount that the radius is increased or decreased.

Figure 7A:
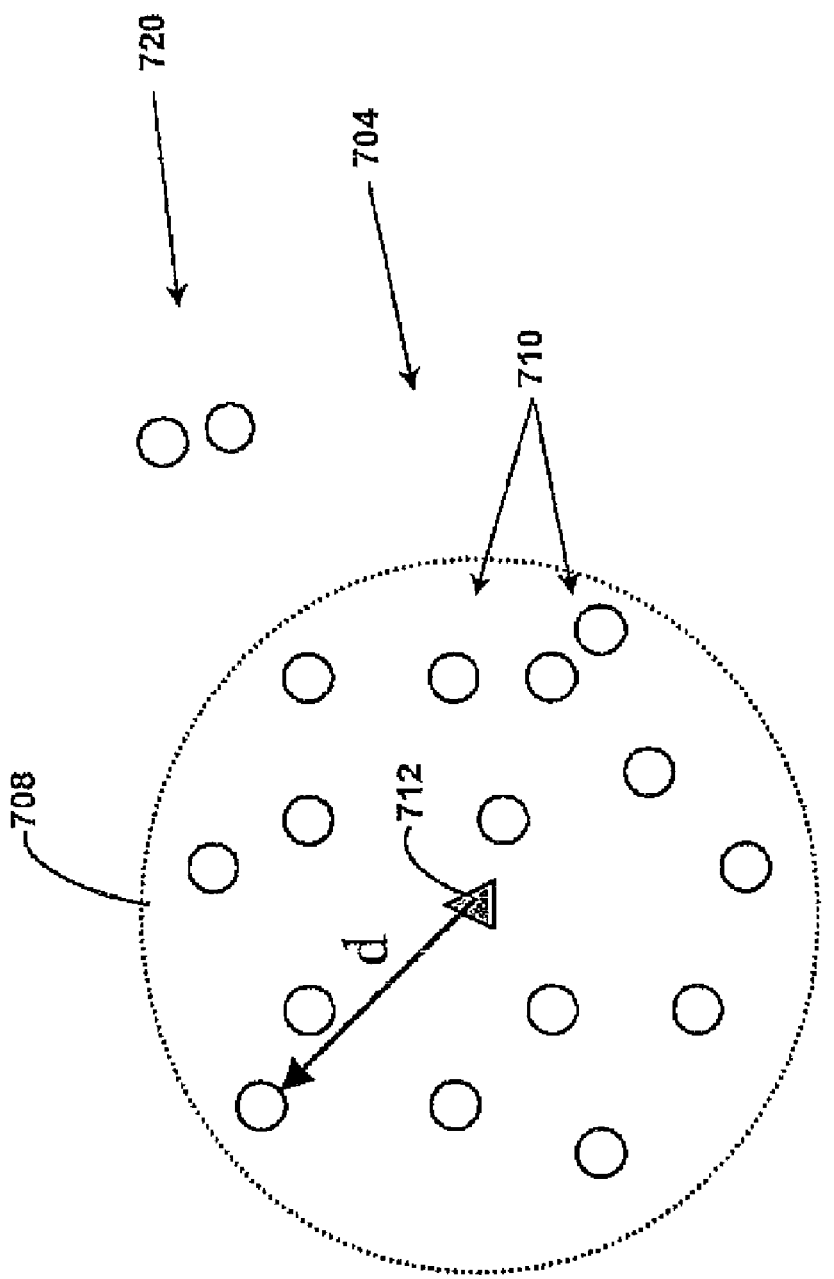
FIG. 7A is a schematic diagram illustrating another example of a method for increasing accuracy of an estimated cell center location.
Figure 7B:
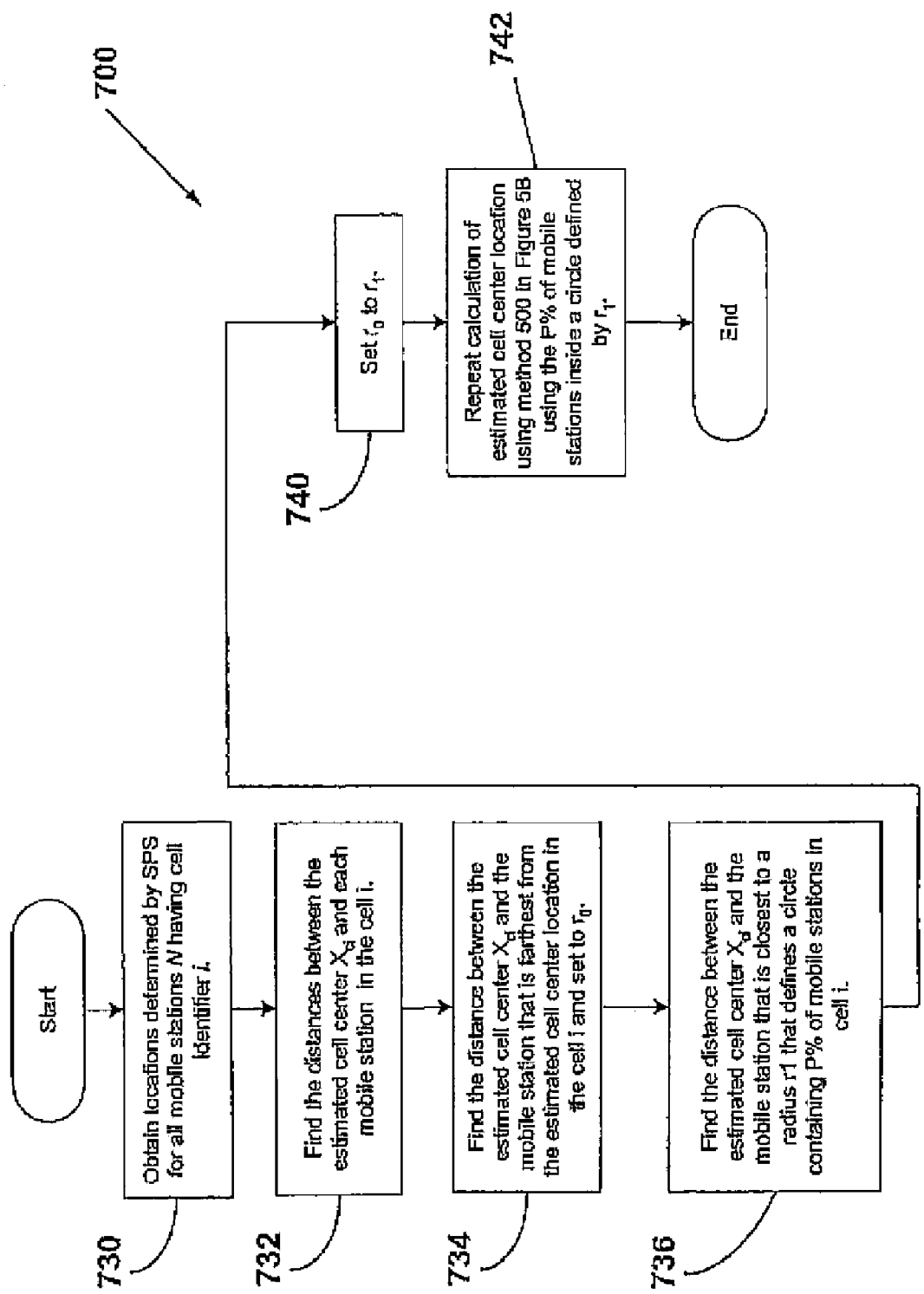
FIG. 7B is a flowchart of another example of a method for estimating a cell center location.

The method 600 in FIG. 6B may augment the method 500 of FIG. 5B to determine a more accurate cell center location by filtering the sample size to include the mobile stations that are more uniformly distributed; that is, by removing any outliers that may limit the validity of assuming that the mobile stations are uniformly distributed. Another example of a method for increasing accuracy of a cell center estimate is shown in FIGS. 7A & 7B. In FIG. 7A, a cell 704 is again illustrated as a circle 708 with an initial cell center estimate 712. The cell 704 selves a number of mobile stations 710. In the example shown in FIG. 7A, the distance of the most distant mobile station in a percentage of the mobile stations served by the cell is minimized to remove the effect of outlier mobile stations 720. The maximum distance in the percentage of mobile stations may be minimized by first determining the distance of each of the mobile stations from the initial cell center estimate 712 using the mobile station location information. The distances of the mobile stations are then analyzed by selecting the desired percentage of mobile stations that are closest to the estimated cell center location. The cell center estimator 424 may then re-calculate an estimated cell center using the mobile station locations for the selected percentage of the mobile stations. The process may be periodically performed to adjust the cell center estimate to be more accurate. If the cell radius is stored in the database, the cell radius may be updated each time the cell center estimate is adjusted.

FIG. 7B is a flowchart of a method 700 for increasing accuracy of a cell center estimated location. The method 700 illustrated by in FIG. 7B may be performed in the cell center estimator 424 (in FIG. 4) and may be performed subsequent to the method 500 illustrated in FIG. 5B and/or the method 600 illustrated in FIG. 6B. The method 700 includes step 730 in which the locations (as determined by the SPS positioning system) of all N mobile stations may be retrieved from a storage element (such as a database with a structure similar to that of Table 1). At step 732, the method determines the distance of each mobile station from the estimated cell center $X_{ci}$ as calculated for example, by using method 500 in FIG. 5B, or by method 600 in FIG. 6B. At step 734, the method 700 searches for the distance between the estimated cell center location and the mobile station that is farthest away from the estimated cell center location. This distance is defined to be an initial cell radius $r_0$. At step 736, a function is performed to determine the distance between the estimated cell center Xci and the mobile station that is closest to a radius, r1, that defines a circle that encompasses P % of the mobile stations in the cell. For example, this may be done by arranging the N mobile stations in order from closest to farthest relative to the estimated cell center location. Then the first P % of the N mobile stations are identified to be within circle defined by the reduced cell radius. A radius $r_1$ is then defined to be the cell radius at step 740. At step 742, the calculation of the estimated cell center location using method 500 in FIG. 5B may then be performed using only the P % of the mobile stations identified in step 736.

Figure 8:
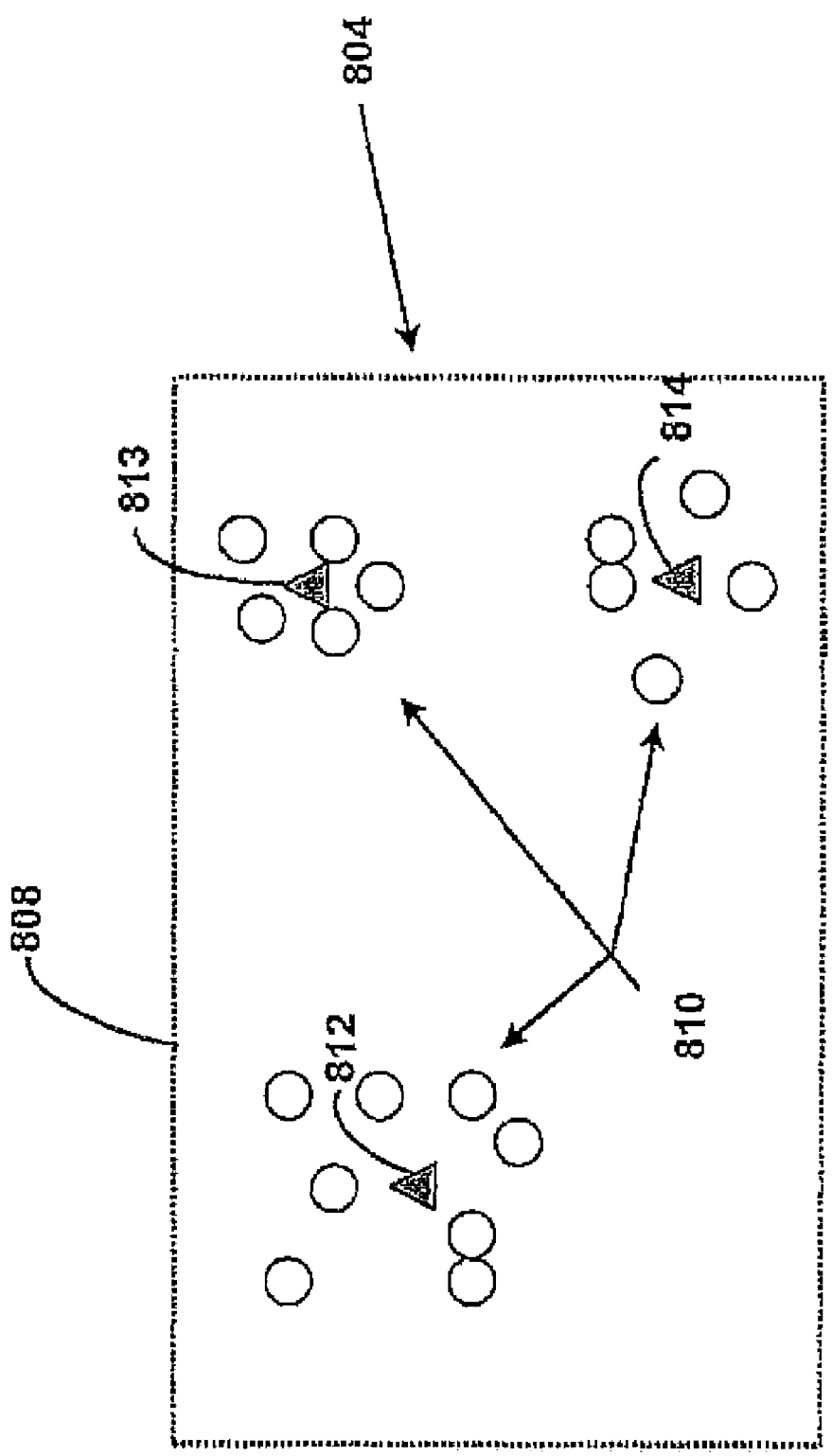
FIG. 8 is a schematic diagram illustrating another example of a method for estimating a cell center.

In some cases, it may not be possible to assume a uniform distribution of mobile stations in a cell. FIG. 8 schematically illustrates a cell 804 defined as a rectangle 808 in which mobile stations are distributed in three clusters 810. Each cluster 810 may be analyzed by assuming each cluster 810 is evenly distributed and using the mobile station location information in each cluster 810 in equations (2) and (3), or in equation (5) above to determine an estimated center for each cluster 812, 813, 814. To determine if the mobile station locations map out in clusters, a method may calculate an initial cell radius as described above for the entire cell. The method may then take fractional parts of the initial cell radius (e.g. ½, ⅓, ¼) and use the parts to draw circles in random locations within the cell. The areas within these circles may then be analyzed to determine the number of mobile station locations within the areas and whether the number is sufficient to provide a reasonably accurate estimate of a center location for the circles. Such a method may use equations (7), (8), and (9) above to determine the adequacy of the circle areas being analyzed. This process may be periodically updated to update the estimated cell center location. In addition, a check may periodically be performed to ensure that the mobile stations remain in an uneven distribution. The clusters may also be redefined periodically as mobile stations move within the cell 804.

Figure 9:
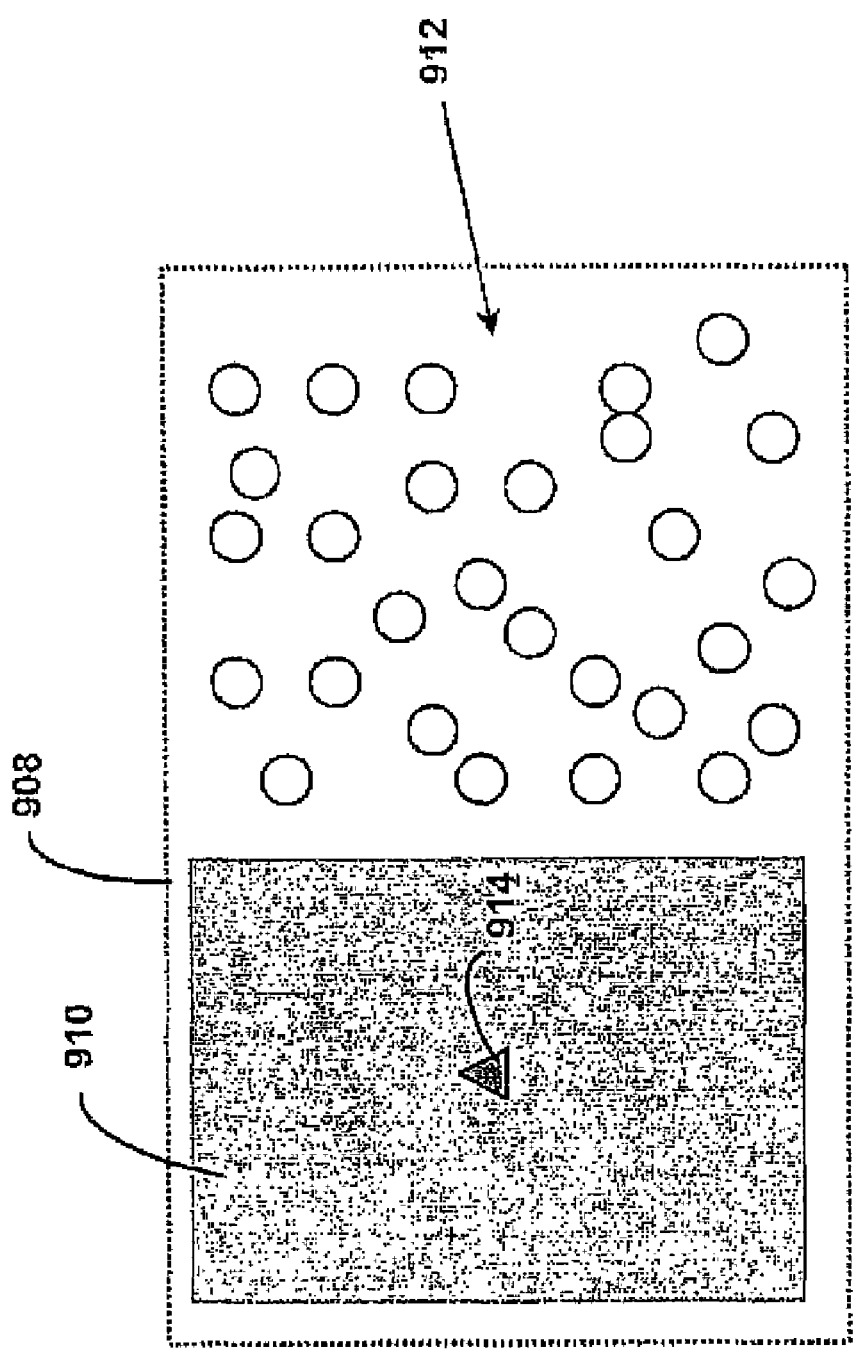
FIG. 9 is a schematic diagram illustrating all example of another method for estimating a cell center.

In some cases, a mobile station may not be able to locate itself using the SPS positioning system because it may be located in a space that does not receive wireless communications services. FIG. 9 illustrates an example in which a cell 904 is defined by its entire cell coverage area as a rectangle 908. The mobile stations 912 served by the cell 904 may be found to cluster in one portion of the cell 904. A complementary area 910, which is defined as the whole cell coverage area 908 minus mobile phone clustered areas 912, is illustrated in FIG. 9 as a shaded area. It is assume that the whole cell coverage area 908 may be given as a specification, or a parameter available to the SPS server. The center 914 of the complementary area 910 may be used as an alternative location estimate when an SPS signal is not available. In this example, when a mobile station can not receive SPS signals, it may be assumed to be located in some no-signal zones of the cell 904.

The methods described above with reference to FIGS. 5A-9 may be available and implemented in the cell center estimator 424 in FIG. 4. Because the methods described above with reference to FIGS. 5A and 7B assume that the mobile stations in the cell are uniformly distributed, the cell center estimator 424 may include a method to determine if the mobile stations are uniformly distributed, or uniformly distributed in clusters (e.g. FIG. 8).

It will be understood, and is appreciated by persons skilled in the art, that one or more functions, modules, units, blocks, processes, sub-processes, or process steps described above may be performed by hardware and/or software. If the process is performed by software, the software may reside in software memory (not shown) in the SPS server. The software in software memory may include an ordered listing of executable instructions for implementing logical functions (i.e., "logic" that may be implemented either in digital form such as digital circuitry or source code or in analog form such as analog circuitry or an analog source such an analog electrical, sound or video signal), and may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, all electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires, a portable computer diskette (magnetic), a RAM (electronic), a read-only memory "ROM" (electronic), an erasable programmable read-only memory (EPROM or Flash memory) (electronic), all optical fiber (optical), and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

What is claimed is:

1. A method for estimating a cell location for a cell that provides wireless communication services to a plurality of mobile stations each mobile station having a Satellite Positioning System ("SPS") receiver operating in a positioning system, the method comprising:
    obtaining a mobile station location for each of N mobile stations having a cell identifier that identifies the cell, each mobile station location being determined using the positioning system; and
    testing the mobile station locations to determine if the mobile stations are clustered by:
    determining a first estimated cell center location and a cell radius;
    defining a plurality of circles having respective radii less than the cell radius with respective centers at respectively different locations within the cell;
    determining if each of the plurality of circles defines an area containing a cluster of mobile station locations based on the number of mobile stations within each of the circles; and
    calculating a final estimated location of the cell center based on the determined locations of the plurality of circles.

2. The method of claim 1 where:
    the step of calculating the first estimated location of the cell center is based on a maximum likelihood location and further comprises:
    Obtaining an SPS variance, $V_j$, for each mobile station, j, in the cell;
    Calculating a cell location variance, $V_{ij}$, of a true position of each mobile station j in the cell relative to the first estimated cell center location according to:

$$V_{ij} = \begin{bmatrix} \sigma_{ij}^2 & 0 \\ 0 & \sigma_{ij}^2 \end{bmatrix} + V_j$$

where $\sigma_{ij}^2$ is a variance of a true position of the mobile station j relative to a true cell center position;
    using the variance $V_{ij}$ of each mobile station J of N to determine the maximum likelihood mobile station using:

$$\hat{X}_{ci} = \left[ \sum_{j=1}^{N} V_{ij}^{-1} \right]^{-1} \sum_{j=1}^{N} [V_{ij}^{-1} \hat{X}_j],$$

for the cell i, where N is the number of mobile stations in the cell.

3. The method of claim 2 further comprising the steps of:
    determining an initial cell radius, $r_0$; and
    setting $\sigma_{ij}^2 = (r_0/2)^2$.

4. The method of claim 1 wherein the step of calculating the first estimated location of the cell center is based on a mean mobile station location, and further comprises:
    For N mobile stations, calculating the mean using:
    mean mobile station $$\text{mean mobile station location} = \frac{1}{N} \sum_{j=1}^{N} \hat{X}_j \text{ where } \hat{X}_j$$

where $\hat{X}_j$ is a true position of each mobile station j=1 to N.

5. The method of claim 1 wherein the determining of the first cell center location and the cell radius comprises the steps of:
    determining respective locations of the N mobile stations in the cell;
    estimating the first cell center location from the determined locations of the N mobile stations;
    determining a respective distance between the first estimated cell center location and each of the N mobile stations in the cell;
    determining an initial cell radius by determining the distance between the first estimated cell center location and the mobile station that is farthest away from the first estimated cell center location;
    determining a minimized radius $r_1$ as P % of the initial cell radius;
    determining if P % of the N mobile stations in the cell are located within a circle defined by $r_1$;
    if P % of the N mobile stations in the cell are located within a circle defined by $r_1$, then determining a revised first estimated cell center location by performing the following steps:

17 obtaining a mobile station location for each of N mobile stations having a cell identifier that identifies the cell, each mobile station location being determined using the positioning system; and calculating the revised first estimated location of a cell center based on a statistical measure of the mobile station locations of the N mobile stations in the cell where the statistical measure is either a maximum likelihood location or a mean mobile station location.

6. The method of claim 1 wherein the determining of the first estimated cell center location and the cell radius comprises:

determining respective locations of the N mobile stations in the cell;

estimating the first cell center location from the determined locations of the N mobile stations;

determining a respective distance between the first estimated cell center location and each of the N mobile stations in the cell;

determining an initial cell radius by determining the distance between the first estimated cell center location and the mobile station that is farthest away from the first estimated cell center location;

determining a distance between the first estimated cell center location and the mobile station that is closest to a radius r1 that defines a circle containing P % of the N mobile stations in the cell;

determining a revised first estimated cell center location by performing the following steps:

obtaining a mobile station location for each of N mobile stations having a cell identifier that identifies the cell, each mobile station location being determined using the positioning system; and calculating the revised first estimated location of a cell center based on a statistical measure of the mobile station locations of the N mobile stations in the cell where the statistical measure is either a maximum likelihood location or a mean mobile station location.

7. The method of claim 1 further comprising:

for each of the plurality of circles that defines a cluster of uniformly distributed mobile station locations, determining an estimated cluster center location by performing the following steps:

obtaining a mobile station location for each of N mobile stations in the cluster, each mobile station location being determined using the positioning system; and calculating an estimated location of a cluster center based on a statistical measure of the mobile station locations of the N mobile stations in the cluster where the statistical measure is either a maximum likelihood location or a mean mobile station location.

8. A method for approximating a current mobile station location for a mobile station comprising:

retrieving a cell identifier for the mobile station;

calculating an estimated cell center location by performing the method of claim 1; and defining the approximate current mobile station location to be the estimated cell center location.

9. A tangible computer readable medium having a plurality of instructions for performing programmed functions including the method of claim 1.

10. A system for estimating a cell center location in a satellite positioning system ("SPS") comprising:

a SPS server connected to the SPS system to retrieve a plurality of mobile station locations from mobile stations in a cell in a wireless communication system, each mobile station comprising an SPS receiver;

18 a SPS database for storing the plurality of mobile station locations and a cell identifier to identify the cell in which the mobile station is obtaining wireless communications service; and a cell center location estimator for calculating an estimated cell center location by testing the mobile station locations to determine if the mobile stations are clustered by:

determining a first estimated cell center and a cell radius;

defining a plurality of circles having respective radii less than the cell radius with respective centers at respectively different locations within the cell;

determining if each of the plurality of circles defines an area containing a cluster of mobile station locations based on the number of mobile stations within each of the circles; and calculating a final estimated location of the cell center based on the determined locations of the plurality of circles.

11. The system of claim 10 where the SPS database stores a horizontal variance, $V_j$ of each mobile station location as determined by the SPS positioning system; and the cell center location estimator further comprises:

a variance calculation function for calculating a variance of a true position of each of the N mobile stations relative to the first estimated cell center as a function of $V_j$; and a maximum likelihood mobile station location function for calculating the maximum likelihood mobile station location as a function of the variance of the true position of each of the N mobile stations relative to the first estimated cell center location and the N mobile station locations.

12. The system of claim 11 where:

the variance calculation function calculates the variance of the true position of each of the N mobile stations relative to the first estimated cell center location using:

$$V_{ij} = \begin{bmatrix} \sigma_{ij}^2 & 0 \\ 0 & \sigma_{ij}^2 \end{bmatrix} + V_j,$$

where $\sigma_{ij}^2$ is a variance of a true position of the mobile station j relative to a true cell center position, and where $\sigma_{ij}^2 = (r_0/2)^2$ where $r_0$ is the initial cell radius; and the maximum likelihood mobile station location function calculates the maximum likelihood mobile station location using:

$$\hat{X}_{ci} = \left[\sum_{j=1}^{N} V_{ij}^{-1}\right]^{-1} \sum_{j=1}^{N} [V_{ij}^{-1} \hat{X}_j],$$

for the cell i, where N is the number of mobile stations in the cell.

13. The system of claim 10 where the cell center location estimator further comprises a mean mobile station location function to calculate the mean mobile station location of the N mobile stations.

14. The system of claim 13 where the mean mobile station location function calculates the mean mobile station location using:

mean mobile station $$\text{mean mobile station location} = \frac{1}{N}\sum_{j=1}^{N}\hat{X}_j$$

where $\hat{X}_j$ a true position of each mobile station j=1 to N.

15. The system of claim 10 where the cell center location estimator further comprises a mobile station location filter to find a minimum radius defining a circle around a first estimated cell center location that includes a selected percentage of the N mobile station locations.

16. The system of claim 10 where the cell center location estimator further comprises a mobile station location filter to select a selected percentage of the N mobile station location that are closest to a first estimated cell center location where the selected percentage of N mobile stations is used by the cell center location estimator to calculate a second estimated cell center location.

17. The system of claim 10 wherein:
The cell center location estimator includes a cluster center location estimator for defining a plurality of clusters of mobile stations in the cell corresponding to the plurality of circles, each cluster containing a number $N_c$ of mobile stations.

18. A tangible computer readable medium having programmed instructions for operation in a wireless communication system that uses a satellite positioning system ("SPS"), the tangible computer readable medium comprising:
a SPS database interface for retrieving data relating to a plurality of mobile stations in a cell of the wireless communications system, the data including, for each mobile station, a mobile station location and a cell identifier to identify the cell in which the mobile station is obtaining wireless communications service; and
a plurality of programmed instruction for calculating all estimated cell center location by testing the mobile station locations to determine if the mobile stations are clustered by:
determining a first estimated cell center location and a cell radius;
defining a plurality of circles having respective radii less than the cell radius with respective centers at respectively different locations within the cell;
determining if each of the plurality of circles defines an area containing a cluster of mobile station locations based on the number of mobile stations within each of the circles; and
calculating an estimated location of the cell center based on the determined locations of the plurality of circles.

19. A computer readable medium according to claim 18 where the SPS database stores a horizontal variance, $V_J$ of each mobile station location as determined by the SPS positioning system;:
wherein the plurality of programmed instructions to determine the cell radius includes:
instructions for calculating a variance of a true position of each of the N mobile stations relative to the first estimated cell center as a function of $V_j$; and
instructions for calculating a maximum likelihood mobile station location as a function of the variance of the true position of each of the N mobile stations relative to the first estimated cell center location and the N mobile station locations.

20. A computer readable medium according to claim 18 wherein the plurality of programmed instructions to determine the first estimated cell center location and the cell radius includes instructions to calculate the mean mobile station location of the N mobile stations.

21. A computer readable medium according to claim 18 wherein the plurality of programmed instructions to determine the first estimated cell center location and the cell radius includes instructions for defining a circle around a first estimated cell center location that includes a selected percentage of the N mobile station locations where the selected percentage of the N mobile station locations location.

22. A computer readable medium according to claim 18 wherein the plurality of programmed instructions to determine the first estimated cell center location and the cell radius includes instructions for select identifying a selected percentage of the N mobile station location that are closest to the first estimated cell center location where the identified N mobile stations are used by the cell center location estimator to calculate a revised first estimated cell center location.

23. All apparatus in a wireless communication system a satellite positioning system ("SPS") comprising:
a first interface to a SPS database for retrieving from storage in the SPS database a plurality of mobile station locations corresponding to a plurality of mobile stations operating in a cell of the wireless communication system and a cell identifier to identify the cell in which the mobile station is obtaining wireless communications service; and
testing the mobile station locations to determine if the mobile stations are clustered by:
determining a first estimated cell center location and a cell radius;
defining a plurality of circles having respective radii less than the cell radius with respective centers at respectively different locations within the cell;
determining if each of the plurality of circles defines an area containing a cluster of mobile station locations based on the number of mobile stations within each of the circles; and
calculating a final estimated location of the cell center based on the determined locations of the plurality of circles.

24. The apparatus of claim 23 where the first interface to the SPS database retrieves a horizontal valiance, $V_j$ of each mobile station location as determined by the SPS positioning system; and the cell center location estimator further comprises:
a variance calculation function for calculating a variance of a true position of each of the N mobile stations relative to the first estimated cell center location as a function of $V_j$; and
a maximum likelihood mobile station location function for calculating the maximum likelihood mobile station location as a function of the variance of the true position of each of the N mobile stations relative to the first estimated cell center location and the N mobile station locations.

25. The apparatus of claim 23 where the cell center location estimator further comprises a mean mobile station location function to calculate the mean mobile station location of the N mobile stations.

26. The apparatus of claim 23 where the cell center location estimator further comprises a mobile station location filter to find a minimum radius defining a circle around the first estimated cell center location that includes a selected percentage of the N mobile station locations where the selected percentage of the N mobile station locations location.

27. The apparatus of claim 23 where the cell center location estimator further comprises a mobile station location filter to select a selected percentage of the N mobile station location that are closest to the first estimated cell center location where the selected percentage of N mobile stations is used by the cell center location estimator to calculate a revised first estimated cell center location.

* * * * *

UNITED STATES PATENT AND TRADEMARK OFFICE
CERTIFICATE OF CORRECTION

PATENT NO. : 7,974,642 B2  
APPLICATION NO. : 11/676927  
DATED : July 5, 2011  
INVENTOR(S) : Xiangdong Lin et al.

Page 1 of 1

It is certified that error appears in the above-identified patent and that said Letters Patent is hereby corrected as shown below:

Title Page

In Field (75) Second Inventors name spelled incorrectly "Mangesh Chambarkar" should be --Mangesh Chansarkar--

After Field (65) Please add the following:

Related U.S. Applications

(63) U.S. Application Serial No. 11/645,114, filed December 22, 2006, which is a continuation-in-part of U.S. Application Serial No. 10/489,225, filed September 10, 2002.

(60) Provisional Application Serial No. 60/318,806, filed September 10, 2001.

Signed and Sealed this  
Tenth Day of July, 2012

David J. Kappos  
*Director of the United States Patent and Trademark Office*